April 10, 1934.   O. C. GILMORE   1,953,958
PROJECTOR FOR COLOR MOTION PICTURES
Filed Nov. 3, 1928   3 Sheets-Sheet 1

Witness
William P. Kilroy

Inventor
Otto C. Gilmore
By Charles S. Nelson
Atty.

April 10, 1934.  O. C. GILMORE  1,953,958
PROJECTOR FOR COLOR MOTION PICTURES
Filed Nov. 3, 1928  3 Sheets-Sheet 2
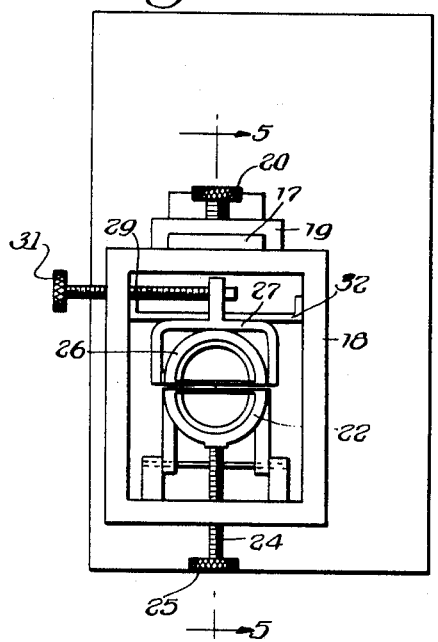
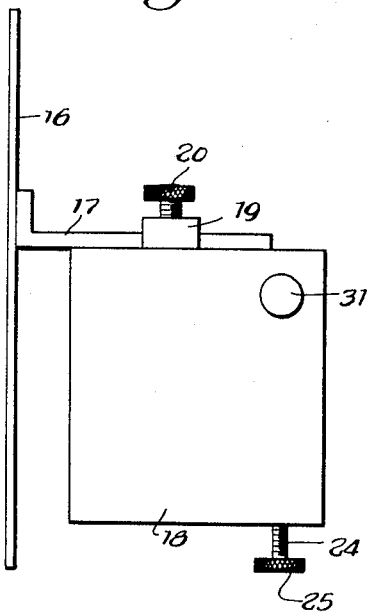
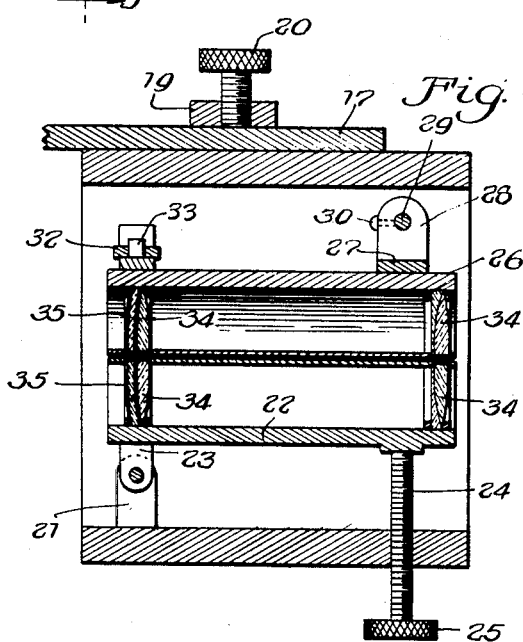
Inventor
Otto C. Gilmore
By Charles S. Nelson
Atty.
Witness
William P. Kilroy April 10, 1934.  O. C. GILMORE  1,953,958
PROJECTOR FOR COLOR MOTION PICTURES
Filed Nov. 3, 1928   3 Sheets-Sheet 3
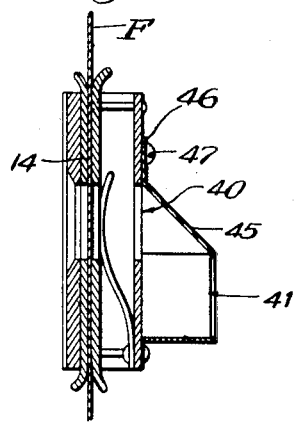
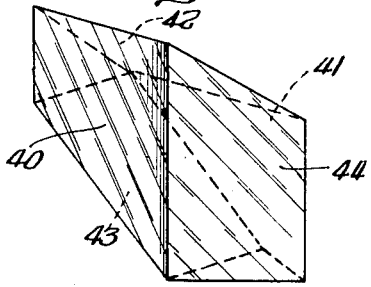
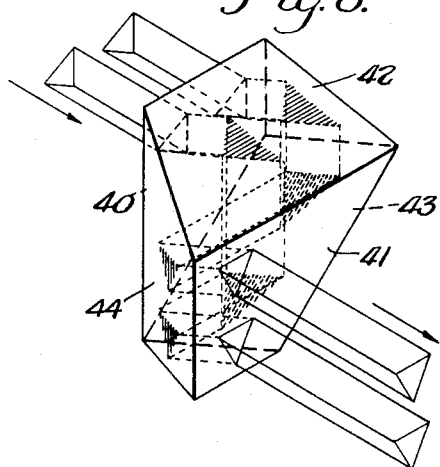
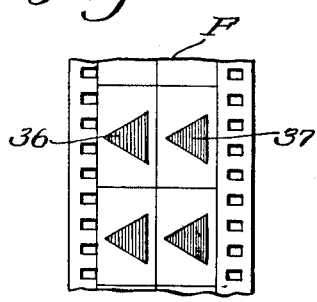
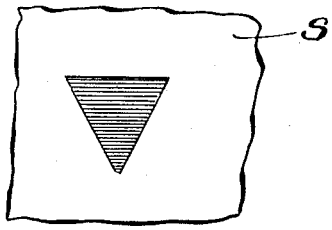
Witness
William P. Kilroy
Inventor,
Otto C. Gilmore
By Charles S. Wilson
Atty.

Patented Apr. 10, 1934

1,953,958

UNITED STATES PATENT OFFICE 1,953,958

PROJECTOR FOR COLOR MOTION PICTURES

Otto C. Gilmore, Chicago, Ill., assignor, by mesne assignments, to Cinemacolor Corporation, Chicago, Ill., a corporation of Delaware Application November 3, 1928, Serial No. 316,901

3 Claims. (Cl. 88—16.4)

This invention relates to mechanism for projecting color motion pictures or motion pictures in natural color, which has for its object the elimination of multiple film and non-standard film in the production and exhibition of color motion pictures, and it contemplates the use of any standard film and apparatus which shall, within its limits, carry all of the exposures, positive or negative, which shall be necessary to the projection of color motion pictures, all without increasing the length of film used.

This invention also has for its object the positioning of all of the images necessary for the creation of a single image in natural color in the space normally allotted to a single image for black and white projection.

With the above and other objects in view, as will be apparent, this invention, among other things, consists in the construction, combination and arrangement of parts, all as hereinafter more fully described, claimed and illustrated in the accompanying drawings wherein:

Fig. 3 is an enlarged front elevation of the lens attachment designed to convert a standard motion picture projector into a projector for the exhibition of color motion pictures made in accordance with the present invention.

Fig. 4 is a side elevation thereof.

Fig. 5 is a vertical longitudinal section taken along line 5—5 of Fig. 3 to illustrate the lens mounting and adjustments.

Fig. 6 is a vertical section through the film gate illustrating the device for turning the images in conjunction therewith.

Fig. 7 is a perspective view of a prism for rotating the images through 90°.

Fig. 8 is a similar view of the prism illustrating the turning of the images through 90°.

Fig. 9 is an elevation of a section of the film and

Fig. 10 is a section of the screen illustrating the images turned through 90° and superposed, one above the other, on the screen to create a single visual image.

Figure 1:
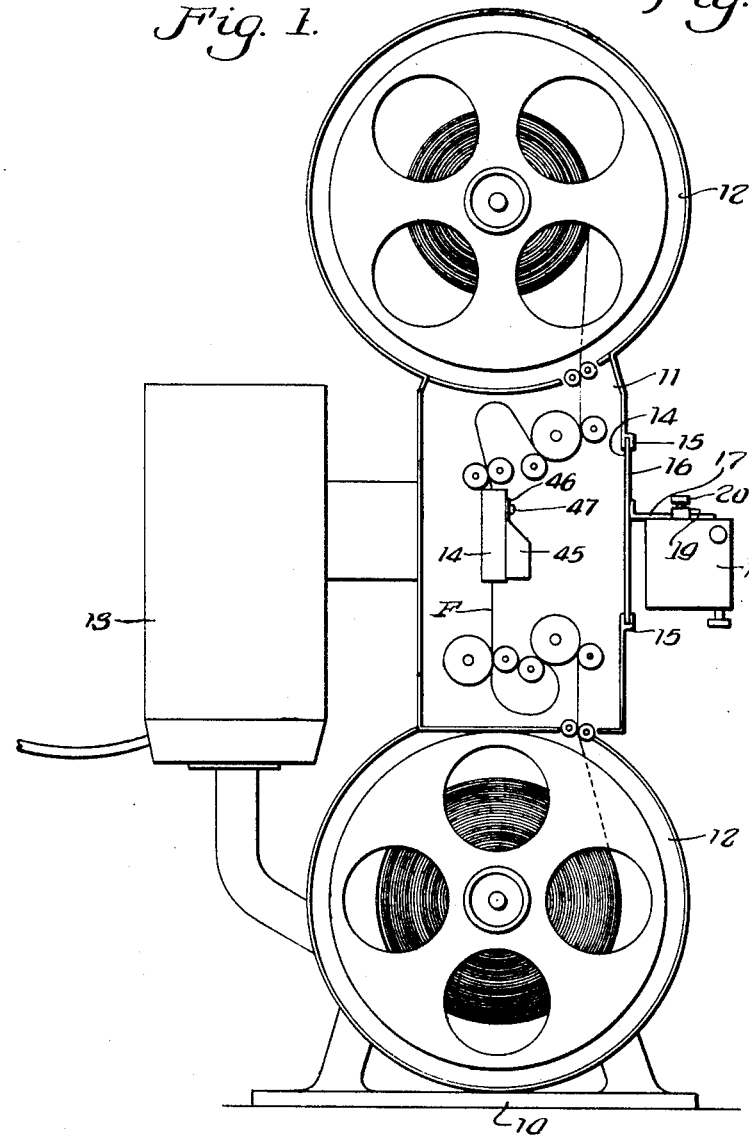
Fig. 1 is a side elevation partially in section of a standard motion picture projecting machine illustrating the present invention in conjunction therewith.
Figure 2:
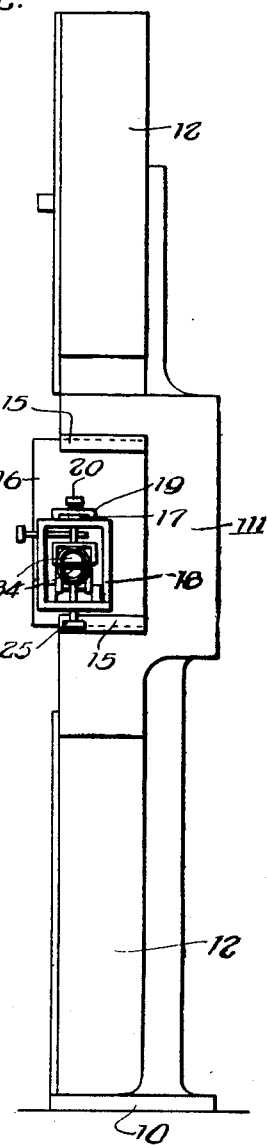
Fig. 2 is a front elevation thereof.

Heretofore in the manufacture of motion pictures, it has been customary to utilize two, and sometimes three color records. Usually these color records correspond to the red orange side of the spectrum and the blue green side of the spectrum and when projected by light with appropriate filters, reproduce images in natural color. In these prior methods, it has been customary to produce the two color records or images by utilizing substantially double the amount of film that would be required for the ordinary standard black and white picture. Furthermore, all of the prior methods either require special projecting machinery or involve complicated processes of treatment of the film which affects its durability and complicates the use of the film.

The present invention contemplates, primarily, the use of a standard camera and a standard projecting machine together with standard film and standard laboratory treatment of the film, for the making and projecting of motion pictures in natural colors. By "standard" in the foregoing use is meant any film, machine or camera which is used for the making and projection of black and white pictures. This is accomplished by the present invention by attachments which may be readily placed in position or removed to convert the apparatus from black and white projection to color projection or vice versa.

Reference being had more particularly to the drawings, 10 designates the base of a projecting machine supporting a casing 11 and upper and lower film magazines 12. A lamp housing 13 is disposed to the rear of the casing 11 and is designed to direct rays of light through the casing 11. Within the casing 11 is a film gate 14, with which is associated the standard and usual mechanism for feeding the film F from one magazine 12 to the other magazine 12 through the casing 11. The side of the casing which is opposed to the lamp housing 13, is provided with an aperture 14 through which the images are projected to the screen in a manner to be hereinafter more fully described. The mechanism described up to this point is a standard projecting machine and the description may be considered to apply not only to the type of projector shown in the drawings but also to any other suitable and standard projector. The present invention being designed to adapt a standard projector to the exhibition of color motion pictures without any modification of the structure therein used, beyond removable additions thereto, contemplates the use of such a projector which may be readily adapted to color or black and white motion picture projection.

The opening 14 on the forward side of the casing 11 is provided with its upper and lower edges with the flanges 15 which, in combination with the wall of the casing form grooves. A plate 16 is designed to be removably mounted in the grooves thus formed to the rear of the flanges 15.

In the normal use of the projector there are two of these plates 16, one of which carries the lenses for the projection of black and white pictures which, when the plate is in position, registers with the film gate 14. The second plate 16 is like that used for black and white projection and carries the lenses for the projection of color motion pictures. As the images for the projection of color motion pictures by the present process are displaced from the direct line of light passing from the lamp housing 13 through the film gate 14, the lenses used in conjunction with the projection of the color motion pictures are positioned somewhat below this direct line. One lens is provided for each color record, and this pair of lenses is carried by the plate 16 used in conjunction with color projection.

Above the opening in the plate 16, (designed for use in conjunction with the projection of motion pictures in color) through which the light passes, is positioned an outstanding arm 17 to which is suspended a lens casing 18 by means of a hanger 19 which is slidably mounted on the arm 17. A set screw 20 pierces the hanger 18 and impinges against the arm 17 to lock the lens casing 18 in its adjusted position on the arm 17. By loosening the screw 20 and adjusting the lens casing 18 and hanger 19 on the arm 17 toward or away from the casing 11, the lenses may be adjusted for focus.

Within the lens casing 18, adjacent the rear end thereof, is a lug 21 centrally positioned on the bottom of the casing. A lower lens shell 22 of a length substantially equal to the length of the casing 18, is pivotally mounted on the lug 21 by means of a second lug 23 fixed to the shell at its rear end, the forward end of the shell bearing upon a set screw 24 which pierces the wall of the casing 18 and is provided at its outer end with a manipulating head 25. An upper lens shell 26 is positioned above the lower lens shell 22 and is of substantially the same shape and size as the lower lens shell. A yoke 27 spans the forward end of the upper lens shell 26 and carries a projecting rider 28. This rider 28 has an aperture adjoining the terminal thereof, in which is received the grooved terminal of a set screw 29. A screw 30 pierces the rider 28 and engages the groove of the set screw 29, to establish a permanent, rotatable connection between the rider and the screw. This set screw 29 passes through the wall of the lens casing 18, where it has threaded engagement with said wall, and at its outer end is provided with a manipulating head 31. Adjoining the rear end of the upper lens shell 26 is a transverse supporting bar 32 extending from one side of the casing 18 to the opposite side thereof, being secured to the sides of the casing. The rear end of the upper lens shell 26 is pivotally supported as at 33 centrally to this supporting bar 32.

Within each of the shells 22 and 26 are mounted a set of lenses 34, each set of lenses being designed to create a complete image on the screen. Associated with each set of lenses carried in each lens shell is a light filter 35, the light filter in the upper shell 26 being generally red-orange, while the one in the lower shell 22 being generally blue-green.

It will be observed that the lens shells 22 and 26 in the lens casing 18 are substantially semicylindrical in form and that each is a complete projecting unit. By providing for the adjustment of the shell 22 about the pivoted connection between the lugs 21 and 23, the lower shell 22 has a vertical adjustment. By pivotally supporting the upper lens shell as at 33 and providing the set screw 29, the upper lens shell has a lateral or horizontal adjustment at its forward end. These two adjustments, to-wit; the vertical adjustment of the forward end of the lower lens shell 22, and the horizontal adjustment of the forward end of the upper lens shell 26, is for the purpose of superposing the images projected by the lenses of each shell, and to control such superimposition to result in accurate registration on the screen. The sliding adjustment of the entire lens casing 18 on the arm 17, provides for a unitary adjustment of both sets of lenses for focusing purposes. These two unitary lens structures, which are individually adjustable are provided for the purpose of projecting simultaneously two individual images, each image representing a distinct collar record and to blend such projected images, one upon the other on the projection screen S in registration.

The film F, for use in conjunction with the apparatus above described, is illustrated in Fig. 9 and the merged and superimposed projected image is illustrated in Fig. 10. Reference being had to these two figures, it will be observed that two images are placed, side by side, on the positive film which is projected by the present apparatus. These images may be designated 36 and 37 and it will be noted from Fig. 9 that both of the images occupy the space on the film normally occupied by a single black and white image, that is to say, a space or frame comprising one inch by three-quarters inch. In order to place two images side by side in a standard frame or space occupied by a single image in the black and white projection, it is necessary to so place the images on the film that one side of each image is located at what would ordinarily be the bottom of the frame or image space. In other words, the image is rotated through 90° and rests upon its side. This rotation of the image permits a pair of images, each of maximum size, in the standard space limitations provided for a single black and white image. The images 36 constitute a color record made through a red orange filter and, therefore, are projected through the red orange filter 35 of the lens casing 18, while the images 37 represent the color record taken through a blue green filter and are, therefore, projected through the blue green filter 35 of the lens casing 18. The present invention contemplates passing the light from the lamp housing 13 through the film F and the images appearing thereon and subsequently turning the images through 90° and projecting them through their respective lens shells 22 and 26, thereby producing two individual images at the outer ends of said lens shells. These images are, by the adjustment of the lens shells as heretofore described, superposed, one upon the other, in accurate registration upon the screen so that the resulting image on the screen S is a single image as indicated in Fig. 10.

The means by which the images are rotated after the light has passed through the film F constitutes a prism structure which is mounted on the film gate and is illustrated in Figs. 6, 7 and 8. It is to be understood that this prism structure or its equivalent may be located at any point in the light path after it leaves the film F.

This image revolving device comprises a prism which has three light reflecting surfaces and two light transmitting surfaces and it is interpositioned between the film and the screen upon which the resulting single image is projected. It is to be understood that the image revolving device may be a single prism or a plurality of prisms, or that it may be a series of mirrors or other light-transmitting and reflecting bodies. These light transmitting surfaces of the prism are designated 40 and 41, the surface 40 being the surface through which the light enters the prism, positioned in a line with the rays of light which carry the images as illustrated in Fig. 9, namely upon their sides. The light entering the prism is reflected by the primary reflecting surface 42 which throws the light at right angles to its path on entering through the transmitting surface 40. This reflected light then contacts with the reflecting surface 43, which again bends the light to take a path at right angles both to the direction of the light entering through the transmitting surface 40 and the direction of the light after it has been reflected by the reflecting surface 42. The light then contacts with the reflecting surface 44 which directs the light in a path parallel to the path of the light entering the transmitting surface 40 and at right angles to the last reflected path of light, whereby the light passes through the second light transmitting surface 41. The light reflecting surface 43, in reflecting the light, also rotates the images through 90° so that they occupy their normal and natural positions when they are reflected by the reflecting surface 44.

This prism may be mounted in the film gate 14, as illustrated in Fig. 6 or it may be positioned at any point in the light path after passing through the film. In other words, it may be positioned on a suitable support within the projector casing 11 or it may be attached to the inner end of the lens casing 18, or to the outer end thereof.

One method of mounting the prism is disclosed in the drawings, which consists of encasing the prism in a metallic shell 45. This shell 45 has suitable openings corresponding to the light transmitting surfaces 40 and 41 of the prism and is provided with an extension 46, through which passes a screw 47 for attaching the shell or casing to the film gate, or to the lens casing 18.

In practice, each projecting machine is provided with one image rotating device or set of devices and two plates 16, one plate 16 carrying the lens structure and adjustments for the projection of black and white motion pictures, and the other plate 16 carrying the lens adjustment and structure for projecting motion pictures in natural colors and illustrated and described herein. In order to convert the projecting machine for the projection of motion pictures in color, it is only necessary to open the casing 11, remove the plate 16 carrying a single lens and replace it with a plate 16 carrying the lens structure herein described and insert the prism or image rotating device. When it is desired to project black and white pictures, the plate 16 carrying the double lens and the prism rotating device are removed and the plate 16 carrying a single lens is placed behind the flanges 15.

From the foregoing, it is apparent that by the use of the present invention, the color records necessary for the projection of motion pictures in natural color, may be placed on a standard film without increasing the quantity of the film necessary. It is further manifest that this projection of motion pictures in natural color may be accomplished by standard mechanism which may be readily converted either to the projection of motion pictures in natural color or to the projection of black and white pictures.

What is claimed is:—

1. A projector having an outlet opening in combination with a carrier cooperating with said opening, of a lens casing mounted on said carrier, a lug on the bottom of said casing, a lens shell within said casing and pivotally mounted on said lug, means adjoining the opposite end of said lens shell for vertical adjustment of said lens casing, a second lens shell positioned above the first lens shell, a supporting bar secured to the sides of the casing adjoining the rear end thereof, means for pivotally supporting said second lens shell thereon, and means adjoining the opposite end of said second lens shell for horizontal rotation of said lens casing.

2. A projector having an outlet opening in a combination with a carrier cooperating with said opening, of a lens casing mounted on said carrier, a lug on the bottom of said casing, a lens shell within said casing and pivotally mounted on said lug, a set screw associated with the opposite end of said lens shell for vertical adjustment of said lens casing, a second lens shell positioned above the first lens shell, a supporting bar secured to the sides of the casing adjoining the rear end thereof, means for pivotally supporting said second lens shell thereon and means adjoining the opposite end of said second lens shell for horizontal rotation of said lens casing.

3. A projector having an outlet opening in combination with a carrier cooperating with said opening, of a lens casing mounted on said carrier, a lug on the bottom of said casing, a lens shell within said casing and pivotally mounted on said lug, a set screw associated with the opposite end of said lens shell for vertical adjustment of said lens casing, a second lens shell positioned above the first lens shell, a supporting bar secured to the sides of the casing adjoining the rear end thereof, means for pivotally supporting said second lens shell thereon, a yoke associated with the opposite end of said second lens shell for horizontal rotation of said lens casing.

OTTO C. GILMORE.